Figure 1:
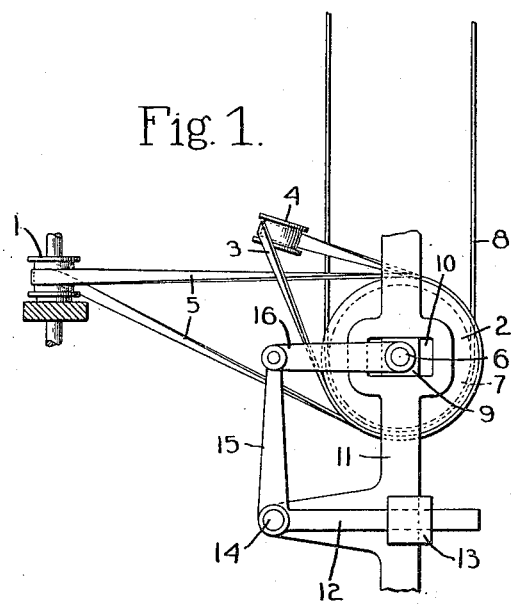

C. W. HUBBARD.
BELT TIGHTENER.
APPLICATION FILED JULY 7, 1916.

1,219,313.

Patented Mar. 13, 1917.

Inventor.
Charles W. Hubbard
by Heard Smith & Tennant.
Attys

UNITED STATES PATENT OFFICE.

CHARLES W. HUBBARD, OF WESTON, MASSACHUSETTS.

BELT-TIGHTENER.

1,219,313. Specification of Letters Patent. Patented Mar. 13, 1917.

Application filed July 7, 1916. Serial No. 108,059.

*To all whom it may concern:*

Be it known that I, CHARLES W. HUBBARD, a citizen of the United States, residing at Weston, county of Middlesex, State of Massachusetts, have invented an Improvement in Belt-Tighteners, of which the following description, in connection with the accompanying drawing, is a specification, like characters on the drawing representing like parts.

This invention relates to apparatus of that type comprising a plurality of driven elements operated from a single driving drum by means of an endless belt, which belt passes around each of the driven elements and around the drum alternately, and the object of the invention is to provide a novel structure of this type having provision for taking up the slack in the belt and maintaining an even tension on all of the runs of the belt.

In order to give an understanding of my invention I have illustrated in the drawings a selected embodiment thereof which will now be described, after which the novel features will be pointed out in the appended claim.

Figure 2:
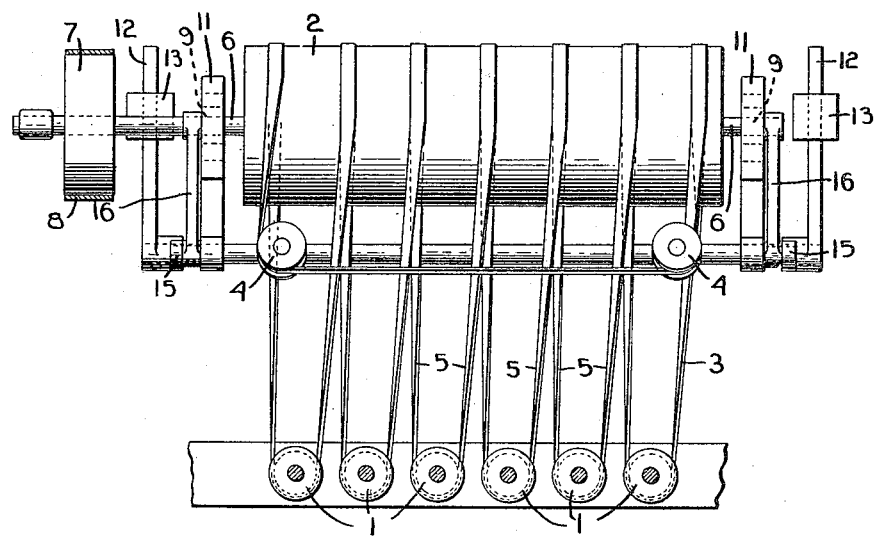

Figure 1 of the drawings is a side view of a portion of an apparatus embodying my invention;

Fig. 2 is a plan view thereof.

I have shown at 1 a plurality of driven elements in the form of pulleys or whirls which are driven from the common driving drum 2 by means of the endless belt 3. This belt 3 passes around each of the driven elements 1 and then around the driving drum 2, said belt thus passing alternately around a driven element and the driving drum. At each end of the drum is an idler or direction pulley 4 around which the belt 3 passes. A driving apparatus of this nature is used in various machines, among which might be mentioned spinning machines, where a plurality of spindles are operated from a single driving drum by means of an endless belt.

In many machines having this driving belt construction, such, for instance, as spinning machines, it is desirable that all of the loops 5 of the belt which pass around the various driven elements 1 should have the same tension in order to obtain uniformity in the operation of the machine. My invention aims to produce this result, and I accomplish it herein by making the driving drum 2 capable of bodily movement toward and from the driving elements 1 and providing means for moving said driving drum 2 bodily in a direction to tighten the belt 3 and maintain it taut.

In the illustrated embodiment of my invention the driving drum 2 is mounted on a driving shaft 6 which may be driven from any suitable source of power, said shaft being herein shown as having a driving pulley 7 thereon which is driven by a belt 8. The shaft 6 of the driving pulley is mounted in bearings 9 which are slidably mounted in ways 10 formed in the uprights 11 of a supporting frame, said ways permitting the bearings 9 to move back and forth toward and from the driving elements 1. Suitable automatically-operative means are employed which tend to move the bearings 9 away from the driving elements 1, thus maintaining the belt 3 under proper tension. In the illustrated embodiment of my invention I show for this purpose two arms 12 having counterweights 13 thereon which are fast on a shaft 14 extending longitudinally of the drum, said shaft having at each end an arm 15 which is connected by a link 16 to one of the bearings 9. The action of the weights 13 through the arms 15 tends to move the bearings to the right, Fig. 1, and thus tends to move the driving drum 2 bodily in a direction to keep the belt 3 taut. Any movement of the drum 2 to the right, Fig. 1, will produce an even tension on all the loops 5 of the belt 3 and the construction herein shown, therefore, insures that all portions of the belt will be subjected to the same tension and that the belt will be automatically maintained under the proper tension.

The weights 13 may be adjusted on the arms 12 so as to produce the desired tension on the belt. The construction herein shown is very simple and it is effective in maintaining a uniform tension on all portions of the endless belt. The device is capable of use generally wherever an endless belt passing a plurality of times around a single driving drum is employed for driving a plurality of driven elements.

I claim:

The combination with a plurality of driven elements, of a driving drum, an endless driving belt passing around each driven element and the driving drum alternately, means for rotating the drum, means for supporting said drum both for rotative movement about its axis and for bodily movement in a direction at right angles to its axis toward and from the driven elements, and automatically-operative means acting on said drum and tending to move it bodily in a direction to maintain the belt tight.

In testimony whereof, I have signed my name to this specification.

CHARLES W. HUBBARD.

Copies of this patent may be obtained for five cents each, by addressing the "Commissioner of Patents, Washington, D. C."